United States Patent [19]
Hooper

[11] Patent Number: 5,168,455
[45] Date of Patent: Dec. 1, 1992

[54] PROCEDURE FOR INCORPORATING TIMING PARAMETERS IN THE SYNTHESIS OF LOGIC CIRCUIT DESIGNS

[75] Inventor: Donald F. Hooper, Northboro, Mass.

[73] Assignee: Digital Equipment Corporation, Maynard, Mass.

[21] Appl. No.: 680,624

[22] Filed: Mar. 28, 1991

[51] Int. Cl.$^5$ ............................................. G06F 15/60
[52] U.S. Cl. .................................. 364/490; 364/489; 364/488
[58] Field of Search ............... 364/488, 489, 490, 491, 364/578

[56] References Cited

U.S. PATENT DOCUMENTS

| | | | |
|---|---|---|---|
| T935,003 | 6/1975 | Linville et al. | 364/490 X |
| 4,263,651 | 4/1981 | Donath et al. | 364/491 |
| 4,698,760 | 10/1987 | Lembach et al. | 364/490 |

FOREIGN PATENT DOCUMENTS 0168650 1/1986 European Pat. Off. ............ 364/489

OTHER PUBLICATIONS

C. L. Forgy, "OPS5 User's Manual," Carnegie-Mellon University (Jul., 1981).
"Optimization of Digital MOS VLSI Circuits", M. D. Matson, Proc. Chapel Hill Conf. on VLSI, University of North Carolina, May 1985, pp. 109-126.
"Analytical Power/Timing Optimization Technique for Digital System", IEEE Proc. 14th Design Automation Conf., A. E. Ruehli, Jun. 1977, pp. 142-146.
"Synchronous Path Analysis in MOS Circuit Simulator", IEEE Proc. 19th Design Automation Conf., V. D. Agrawal, 1982, pp. 629-635.
"Signal Delay in General RC Networks With Application to Timing Simulation of Digitial I.C.", 1984 Conf. on Advanced Research in VLSI, Lin et al., MIT Jan. 1984, pp. 93-99.
"Electrical Optimization of PLAs, " IEEE 22nd Design Automation Conf., K. S. Hedlund, 1985, pp. 681-687.
"Switch-Level Delay Models for Digital MOS VLSI", IEEE 21st Design Automation Conf., J. K. Ousterhout, 1984, pp. 542-548.
"Timing Analysis for nMOS VLSI", IEEE 20th Design Automation Conf., N.P. Jouppi, 1983, pp. 411-418.
"Signal Delay in RC Tree Networks", IEEE Transactions on Computer Aided Design, J. Rubinstein, Jul. 1983, vol. CAD-2, No. 3, pp. 202-210.

Primary Examiner—Vincent N. Trans
Attorney, Agent, or Firm—Finnegan, Henderson, Farabow, Garrett and Dunner

[57] ABSTRACT

The invention comprises a method for the synthesis of a logic circuit by a data processing system in which a plurality of circuit components are examined and are changed in accordance with preestablished rules, and in which timing parameters are estimated for selected circuit locations. Forward timing delays are determined by adding the timing delays associated with the intervening circuit components and media paths between an input terminal or latch component output terminals and successive locations on the signal path. Similarly, a derived budget timing delay constant is calculated by designating a budget or design delay at any location in the circuit and by subtracting timing delays associated with the intervening components between that location and the previous location along the signal path in the reverse direction. The derived budget timing delay constant is subtracted from the forward timing delay at each selected location to derive a timing debt for each selected location. The timing debt can be used as a criterion to determine when the implementation of circuit component should be changed. The timing information is stored in data structures associated with terminals of components and can include data with respect to a multiplicity of designated paths.

17 Claims, 6 Drawing Sheets

FORWARD TIMING DELAY
DERIVED BUDGET TIMING
DELAY CONSTANT
TIMING DEBT

FIG. 6.

PORT INSTANCE PARAMETERS

TIMING DEBT (WORST CASE)

FORWARD TIMING DELAY (BUDGET)
RELATIVE TO TA

DERIVED BUDGET TIMING DELAY CONSTANT (BUDGET)
RELATIVE TO TB

FORWARD TIMING DELAY (BUDGET)
RELATIVE TO TB

DERIVED BUDGET TIMING DELAY CONSTANT (BUDGET)
RELATIVE TO TA

FORWARD TIMING DELAY (BUDGET)
RELATIVE TO INPUT SIGNALS

DERIVED BUDGET TIMING DELAY CONSTANT (BUDGET)
RELATIVE TO OUTPUT SIGNALS

PROCEDURE FOR INCORPORATING TIMING PARAMETERS IN THE SYNTHESIS OF LOGIC CIRCUIT DESIGNS

This application is a continuation, of application Ser. No. 07/394,264, filed Aug. 7, 1989 now abandoned which is continuation of application Ser. No. 06/907,514, filed Sep. 12, 1986 now abandoned.

RELATED PUBLICATIONS

The following publications and U.S. Patent Applications are related documents to the instant Application:

Managing the Chip Design Database, by Randy H. Katz, IEEE Computer, Vol. 16, No. 12, Dec. 1983, pages 26 through 35.

Common LISP: The Language, by Guy L. Steele Jr, 1984, The Digital Press, Maynard, Mass., U.S.A.

Procedure and Data Structures for Synthesis and Transformation of Logic Circuit Designs, invented by Donald F. Hooper et al., assigned to the same assignee named herein, having U.S. Ser. No. 907,303, filed Sep. 12, 1986, now abandoned.

Rule Structure in a Procedure for Synthesis of Logic Circuit Designs, invented by Donald F. Hooper et al., assigned to the same assignee named herein, having U.S. Ser. No. 907,512, filed Sep. 12, 1986, now abandoned.

Data Base Access Mechanism for Rules Utilized by a Synthesis of Procedure for Logic Circuit Designs, invented by Donald F. Hooper, assigned to the same assignee named herein, having U.S. Ser. No. 907,515, filed Sep. 12, 1986, now abandoned.

Rule Structure for Insertion of New Elements in a Circuit Design Synthesis Procedure, invented by Donald F. Hooper et al., assigned to the same assignee named herein, having Ser. No. 907,513, filed Sep. 12, 1986, now abandoned.

Bitwise Implementation Mechanism for a Circuit Design Synthesis Procedure, invented by Donald Hooper et al., assigned to the assignee named herein, having Ser. No. 907,516, filed Sep. 12, 1986, now abandoned.

BACKGROUND OF THE INVENTION

1. Field of the Invention

This invention relates generally to the automated synthesis of logic circuits by a data processing system and more particularly, to the inclusion in the logic circuit synthesis of criteria relating to the timing delays in the circuit that impact the performance of the synthesized circuits.

2. Description of the Related Art

At the frequency at which modern logic circuits, and particularly data processing systems, have been designed to operate, the importance of many properties of the circuits, that previously could be ignored, have become important. One such property is the timing delays found for the components of the logic circuit. The simultaneous presence of a plurality of signals at a predetermined location in the data processing system can be an essential element in the operation of a circuit. Because the signals typically pass through circuit components and travel a finite distance along the conducting leads, the required simultaneity of the signals may not exist.

Referring next to FIG. 1, the procedure for synthesizing a logic circuit design according to the prior art is shown. Model definition data structures from a library of component definitions are entered into the data structures associated with the synthesis data base in step 11. In step 12, the information related to the instances of the circuit design, including the connectivity information, is entered in the data base. The instances of the circuit design are generally in a behavioral or functional form when entered in the synthesis data base. The synthesis procedure relates the design instances of the circuit design to the model instances in step 13. In step 14, a set of rules for the synthesis procedure is applied to each of the model instances and the model instances are altered and connected in such a way as to maximize certain parameters such as size, path delay, power, etc. In step 15, the resulting circuit design is placed in a format that can control the automated fabrication of the circuit.

The foregoing procedure suffers from a lack of flexibility, particularly o timing parameters. Typically, a model instance or component will find a single definition in the model definition library. Associated with each model definition is a timing delay that will be found in the resulting synthesized circuit. Even when a plurality of possible model instances are available to replace the original model instance, the automatic synthesis procedure typically does not have the capability to select a component based on the timing delays. In fact, the capability is not present to determine conveniently that a timing problem is present. Furthermore, the critical paths in which the timing delays are providing the most serious problems can not be automatically identified.

A need has, therefore, been felt for a synthesis procedure that can incorporate timing criteria automatically and for timing criterion that can be conveniently used by the synthesis procedure.

FEATURES OF THE INVENTION

It is an object of the present invention to provide an improved method for automatic design of logic circuits by a data processing system.

It is a feature of the present invention to incorporate timing parameters in the automatic design of logic circuits.

It is another feature of the present invention to provide criteria based on the timing delays of a logic circuit that can be used in the automatic synthesis of the logic circuit.

It is still another feature of the present invention to provide a multiplicity of timing information for terminals of components of a circuit design.

It is yet another feature of the present invention to provide timing parameters in a design synthesis procedure that permits analysis of the circuit paths in any direction.

It is yet another feature of the present invention to provide timing parameters in a design synthesis procedure by calculating timing information between groups of latch components having known timing relationships.

SUMMARY OF THE INVENTION

The aforementioned and other features are obtained, according to the present invention, by determining, for selected locations in a circuit, represented in a memory of a data processing system, the forward timing delay resulting from the model instances (circuit components) and the media between the input terminal(s) and the selected location. Similarly, the derived budget delay constant or reverse timing delay constant, is determined by subtracting the timing delays resulting from the model instances and the media between the selected location and the output terminal from the required or budgeted delay at the output terminal. At each selected location, the derived budget timing delay constant is subtracted from the forward timing delay to provide the timing debt, which determines the amount of the timing delay. Timing data for a multiplicity of designated circuit paths can be stored in association with component terminals. During synthesis of the logic circuits, the timing debt can be used to select a new model instance from alternative model instances for inclusion in the synthesized circuit design. When the circuit paths become too numerous for convenient computation, timing data relative to input terminals, output terminals, and clocked latch components can be used to reduce the amount of data stored at the component terminals.

These and other features of the present invention will be understood upon reading of the following description along with the drawings.

BRIEF DESCRIPTION OF THE DRAWINGS

FIG. 6 illustrates the possible timing parameters associated with a port instance of a circuit design according to the present invention.

DESCRIPTION OF THE PREFERRED EMBODIMENT

Detailed Description of the Figures

Figure 1:
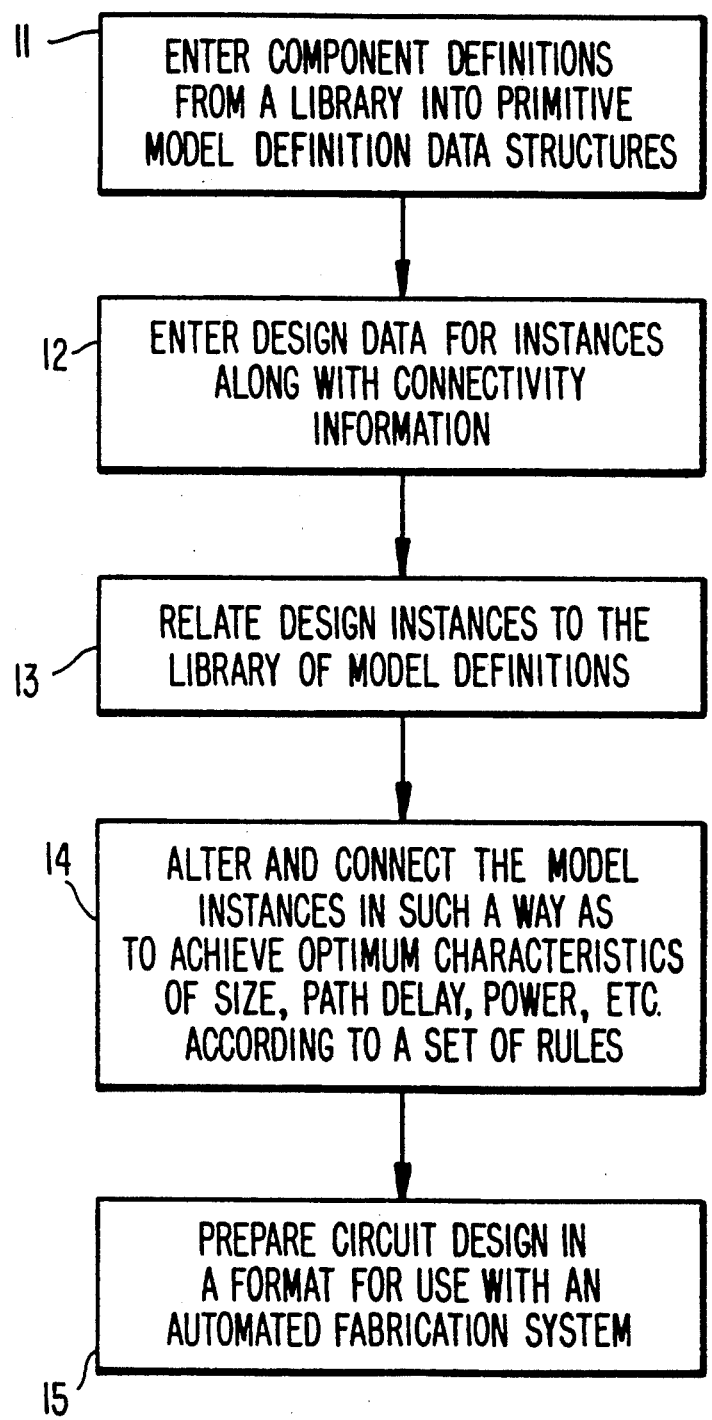
FIG. 1 is a block diagram of the method for synthesizing a circuit according to the related art.

FIG. 1 has previously been described in relation to the related art.

Figure 2:
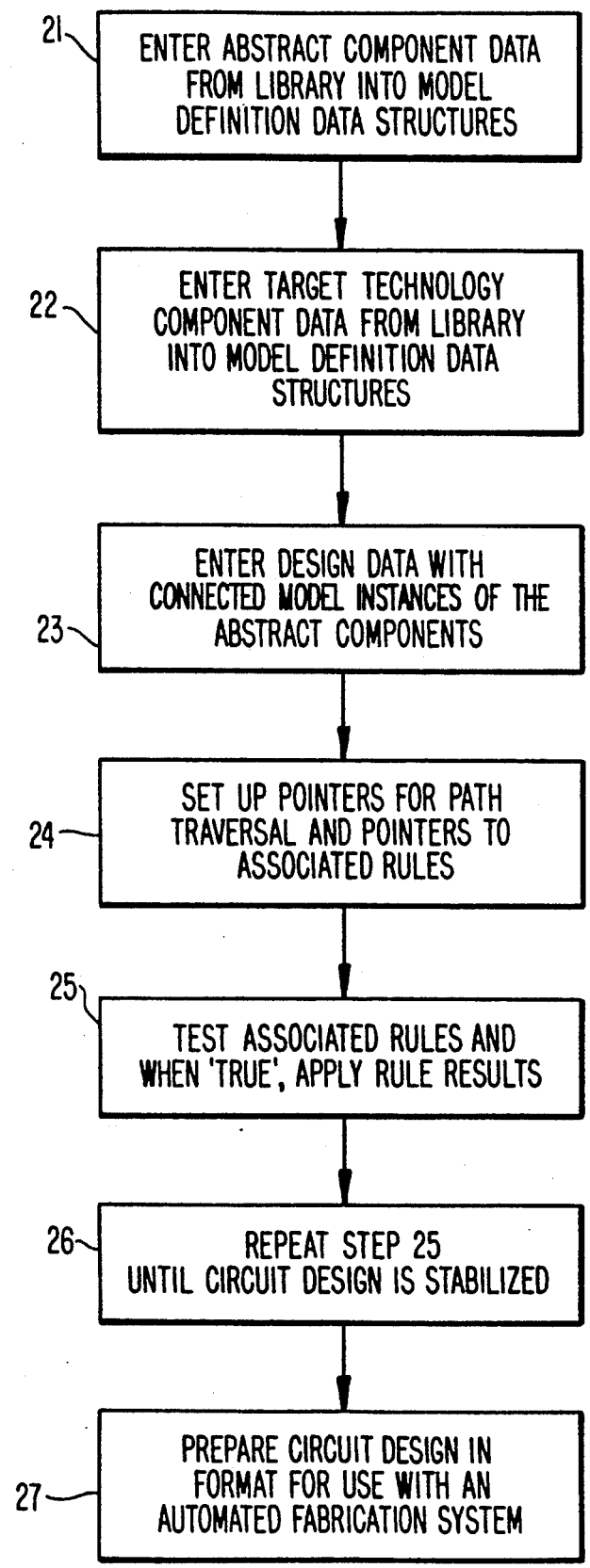
FIG. 2 is a block diagram showing the method for synthesizing a logic circuit design capable of utilizing the present invention.

Referring next to FIG. 2, the synthesis procedure of the present invention is shown. In step 21, abstract component data from a library of abstract component data is entered into model definition data structures of the synthesis procedure. In step 22, component data from the library relating to the target technology is entered into model definition data structures of the synthesis procedure. The circuit design data with the connected model instances described in terms of abstract components is entered into the synthesis procedure in step 23. In step 24, the synthesis procedure provides two sets of pointers. The first set of pointers permits the synthesis procedure to follow any arbitrary path through the design circuit. The second set of pointers couples rules with associated data base structures. In step 25, the associated rules are tested for each model instance and when the test provides a 'true' result, the consequences of the rule is implemented. In the preferred embodiment, each rule has an antecedent portion and a consequence portion. The antecedent portion includes a test algorithm, and the consequence portion provides the information required to implement a result of the test. Because the rules are applied to model instances in a sequential manner, and because in the preferred embodiment the test procedures can involve model instances that are changed as a result of a test applied to that instance, the process is repeated until the circuit design has stabilized, as shown in step 26. In step 27, the final version of the circuit design is placed in a format suitable for use in an automated circuit fabrication system.

Referring next to FIG. 3, the technique for establishing a criterion for use in synthesizing the designed circuit is shown. A group of model instances 350-354 in the data base is used as the basis for synthesizing the circuit. Associated with each model instance is at least one input terminal and at least one output terminal. For example, model instance 350 has input terminals 312 and 313 and an output terminal 314. In addition, files associated with each model instance have stored therein data related to the delay of the elements and this information is displayed in FIG. 3. Referring to FIG. 3, the data files associated with model instance 350 has a 1000 unit delay (media delay or forward time delay) between input terminal 312 and output terminal 314, while model instance 350 has a delay of 1500 units between input terminal 313 and output terminal 314. In addition, the delay between terminals, where important, is also stored in appropriate files and is illustrated in FIG. 3 by a number between terminals. As an example, the time delay between input terminal 310 and terminal 312 of model instance 350 is 500 units.

Figure 3A:
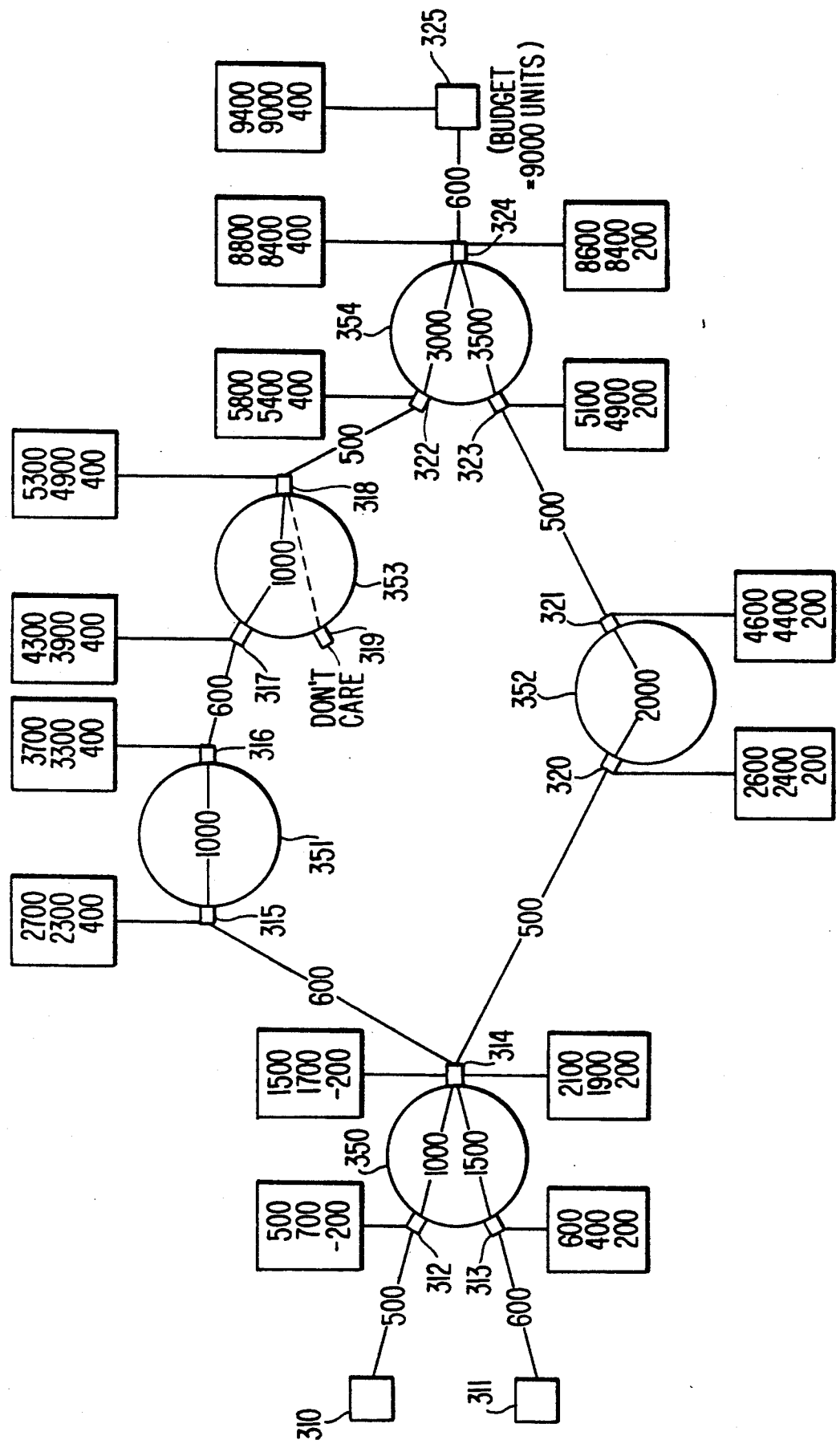
FIG. 3A is a generalized block diagram of a circuit illustrating the calculation of the parameters of the present invention.
Figures 3B, 4:
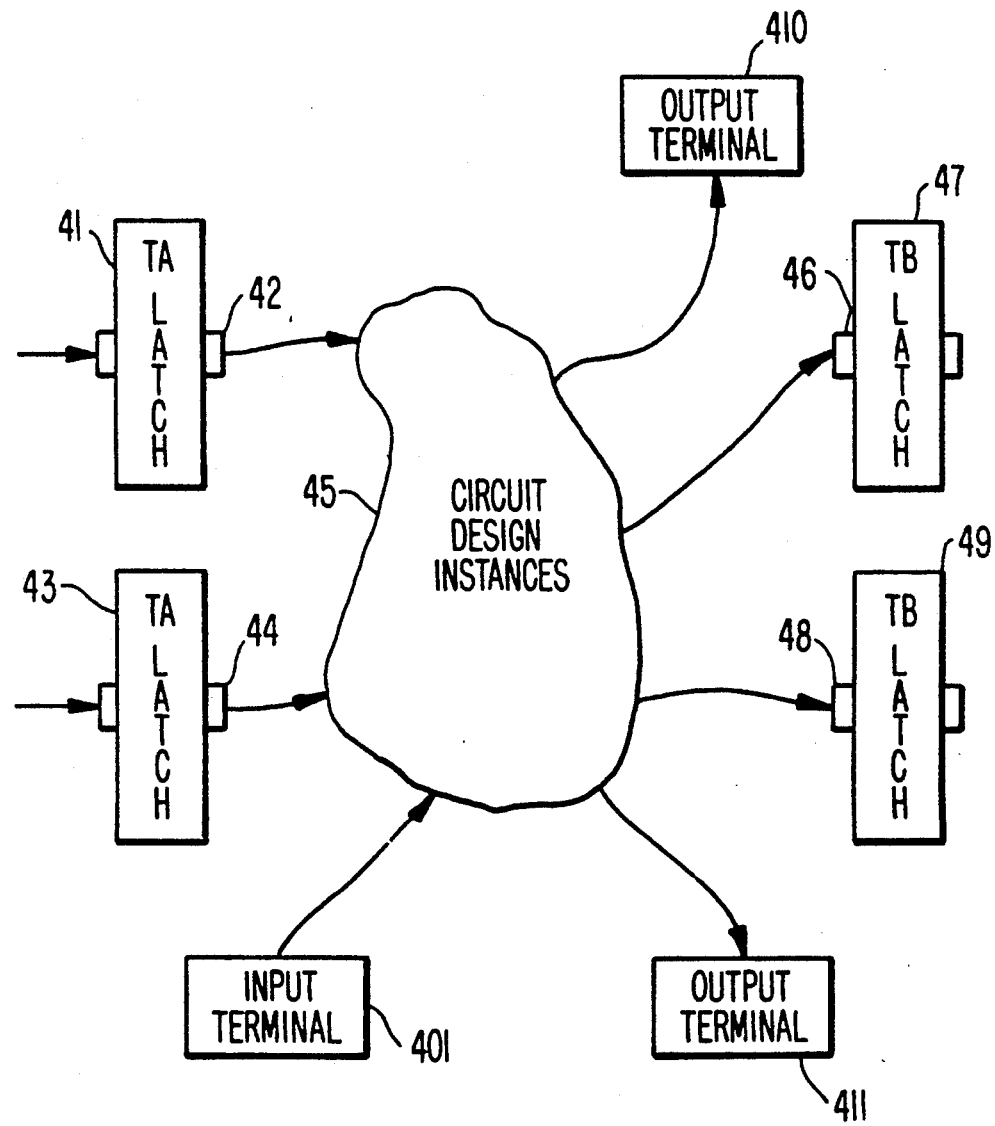
FIG. 3B illustrates the definitions of quantities associated with selected locations of the circuit being synthesized.
FIG. 4 is a block diagram illustrating the application of the present invention to a circuit including latch circuit elements activated by clock signals.

In FIG. 3, each terminal has associated therewith a group of three numbers, the interpretation of which is illustrated in FIG. 3B. The first number is the total time delay from a first input terminal, also called a forward timing delay. By way of illustration, beginning at input terminal 310, the media delay is 500 units. Therefore, the first number in the group of numbers associated with terminal 312 is 500. A signal is next delayed by 1000 units by the model instance 350 between input terminal 312 and output terminal 314. Therefore, the first number associated with the path between terminal 310 and terminal 314 is 1500, i.e., the sum of 500 units and 1000 units. Similarly, the forward time delay in the path from input terminal 311 to the output terminal 314 of model instance 350 is given by 2100 units, i.e., 600 units of media delay between terminal 311 and terminal 313 plus 1500 units of model instance delay between terminal 313 and terminal 314. For paths continuing beyond terminal 314, i.e., the path from terminal 314 to terminal 315 and the path from terminal 314 to terminal 320, the longest (2100 of terminal 314) is chosen to provide consistent results.

The second number associated with each terminal (also called a reverse time delay) in FIG. 3A is the derived budget timing delay constant. This derived budget timing delay constant is determined in the following manner. At an output terminal 325, a time budget is associated therewith. This time budget is the time delay permitted or preestablished by the circuit design. By way of example, the time delay budget for the circuit illustrated in FIG. 3A is 9000 units. Beginning with the delay time requirement for the output terminal(s), the time delays associated with the model instances and the media delays of the intervening paths are subtracted from the time delay budget or requirement to provide the derived budget timing delay constant associated with each terminal. By way of further illustration, at the output terminal 325, the second number (or derived budget timing delay constant is 9000 units). At terminal 324, the output terminal of the model instance 354, the derived budget timing delay constant is 8400 units, the difference between 9000 units at the output terminal and the 600 unit media time delay. Similarly, the derived budget delay constant at terminal 323 of model instance 354 is 4900 units, the difference between the derived timing delay constant of 8400 units at terminal 324 and the delay of 3500 units of the model instance 354 on this signal path.

Associated with each terminal is a third quantity, referred in FIG. 3B as the timing debt. This quantity is an indication of the actual delay versus the required delay and is determined by subtracting the derived budget timing delay constant from the forward timing delay. For example, the timing debt at the output of model instance 352 is 200 units, i.e., 4600 units minus 4400 units. On the other hand, the timing debt at terminal 314 is 1500 units minus 1700 units or minus 200 units. The minus quantity indicates that, at that position of the path, the signal is being delayed by an amount that will not impact the delay of the signal in meeting the timing budget. With reference to model instance 353, an input terminal 319 includes a signal that is not relevant to the timing delays of the circuit. This signal can generally be referred to as a "don't care" signal and is ignored by the program.

Referring next to FIG. 4, a generalized block diagram for a portion of the circuit that includes latch elements activated by clock signals is shown. The signals from one set of latches 41 and 43, activated by a clock signal TA, must be received by the latches 47 and 49 when the latches 47 and 49 are activated at a second clock signal TB. Typically the clock signal TB will have a predetermined delay as compared to clock signal TA, i.e., $TB = TA + N$. The signals must pass through the network 45 to be synthesized. N, (the difference between the clock signal TB and the clock signal TA) can serve the same function as the time budget in the discussion related to FIG. 3A. Thus, the forward time delays can be computed from the output terminals 42 and 44 of latch elements 41 and 43, respectively, to the input terminals 46 and 48 of latch elements 47 and 49, respectively. Then, $N = TB - TA$ can be used as a figure of merit, being the difference between the budget time delay at terminals 46 and 48 of the latches activated by the TB clock signal and the derived budget timing delay constant associated with the model instances in the network portion 45. Having derived the forward timing delays of the network 45 as well as the derived budget timing delay constant of the network, the timing debt can be determined for each model instance and the timing debt can be used in determining the course of the synthesis procedure activity. The circuit instances in network 45 can have timing data associated with input terminals 401 and output terminals 410 and 411.

Figure 5:
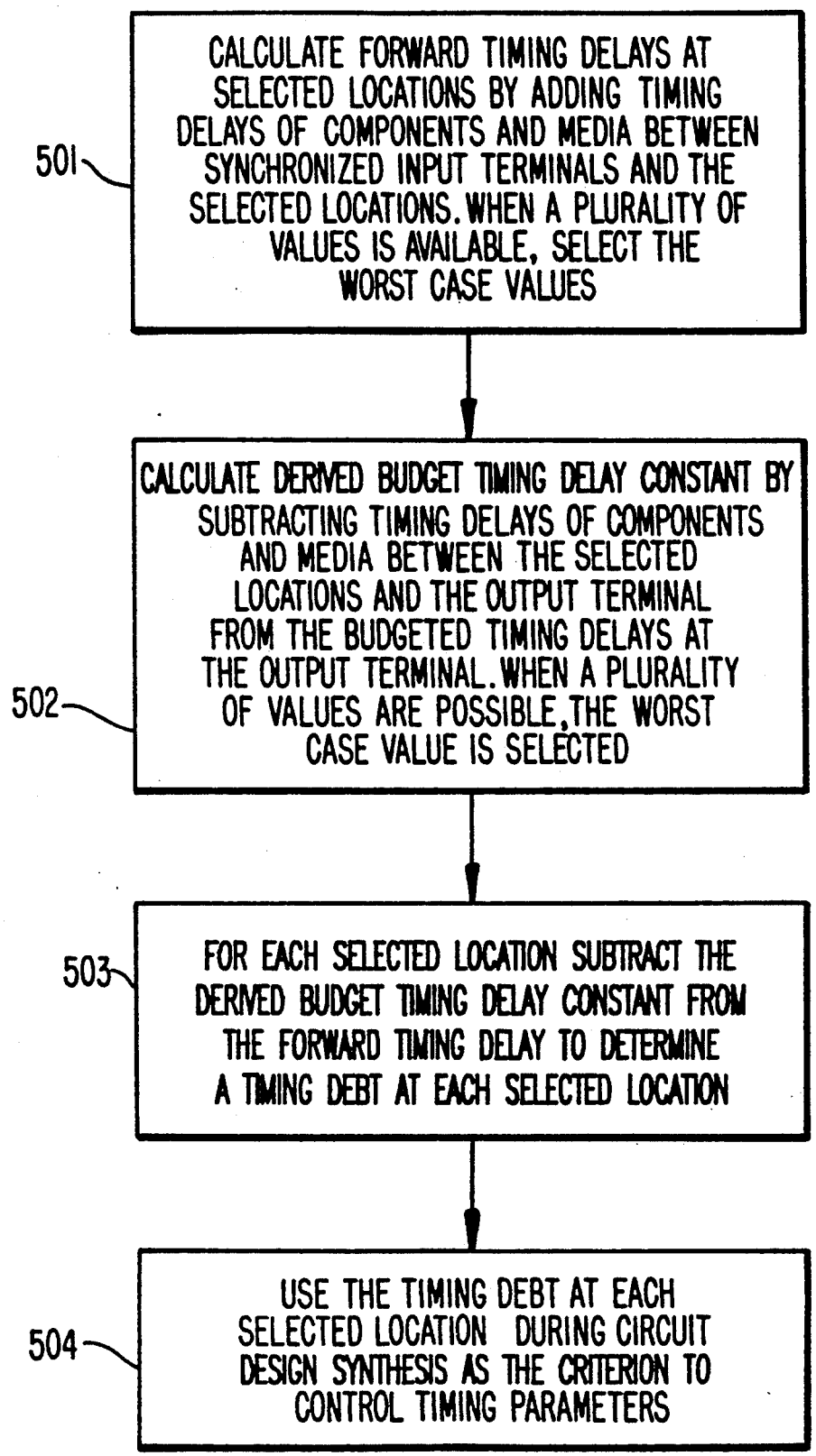
FIG. 5 is a flow chart describing the computation of parameters associated with selected locations in the circuit and the application of these parameters.

Referring to FIG. 5, the procedure for obtaining the timing debts and utilizing the timing debts in circuit synthesis is described. In step 501, the forward timing delays are calculated for a given location in the circuit by adding together the individual timing delays of model instances and media timing delays between an input terminal or synchronized input terminals and the given location. In the event that a plurality of values for the timing delays are available, the worst (greatest) possible timing delay is associated with the given location as the forward timing delay. In step 502, the derived budget timing delay constant is calculated by taking the required or budget timing delay associated with an output terminal or output terminals and subtracting the timing delays of the model instances and media between the given location and the output terminal. Again, when a plurality of values are available, the worst possible value, from the perspective of performance, i.e., the smallest derived budget timing delay constant, is selected. In step 503, the timing debt for each given location is determined by subtracting the derived budget timing delay constant from the forward timing delay. In step 504, the circuit is synthesized and model instances resulting from the synthesis have as at least one criterion the effect of the synthesis on the timing debt at each given location. At the end of the synthesis, the timing debts are again calculated and the synthesis is repeated. This process is repeated until no change in the circuit design will result from the synthesis procedure. The timing delays at the output terminals can be compared with the budget timing delays to determine if the resulting circuit is acceptable.

Referring next to FIG. 6, the timing parameters that can be associated with a port instance in the circuit design is illustrated. The example involves a latch type system having two system clock signals, TA and TB. The port instance can be associated with the input or output terminals of a component (or instance of the circuit design). The stored parameters include a timing debt, a forward timing delay relative to a path from a TA latch, a derived budget timing delay constant relative to the arrival of a signal along a reverse path direction relative to a TB latch, a forward timing delay relative to a signal originating at a TB latch, a derived budget timing delay constant relative to a signal arriving at a TA latch, a forward timing delay relative to an input terminal, and a derived budget timing delay constant relative to output terminals. The timing debt is the worst case of the result of subtracting a derived budget timing delay constant from a forward timing delay.

Operation of the Preferred Embodiment

In the synthesis of logic circuits, the procedure that can utilize the present invention most advantageously can typically examine a plurality of circuit design criteria to determine which possible synthesis component, if any, is to replace the current component in the data base. In the preferred procedure, a plurality of components can be acceptable as synthesis components and a priority procedure is imposed to determine which synthesis component, if any, is to replace the present component in the circuit. In this type of synthesis procedure, the timing debt at each location can be incorporated as an additional priority factor or as the sole criterion for the selection of a replacement synthesis component. In particular, when the total delay from the input terminal(s) to the output terminal(s) is greater than the budget timing delay(s), then the requirement for circuit synthesis can be imposed that, for any model instances or combination of model instances resulting from the synthesis, the time budget must be reduced when such a new synthesis model instance replaces a current model instance. The timing debt parameter also provides a convenient quantity for identifying where the major unacceptable delays are found.

Referring once again to the FIG. 3A, this simple example, discussed in detail above, can be generalized when the data files associated with each port instance can include information in addition to the information of FIG. 3B. In a preferred embodiment, the synthesis procedure can require knowledge of the forward delays at a particular output terminal relative to a plurality of input terminals. Similarly, this knowledge can be required of the derived budget timing delay constants at each input terminal relative to a plurality of output terminals. Furthermore, the derived budget timing delay and forward timing delay can be required for intermediate port instances. Therefore, according to one embodiment, a port instance can have a plurality of forward and reverse timing delays, each associated with a different path in the design circuit. Not only are the plurality of delays stored with each port instance, but each path delay must have an identifying path designation associated therewith. One timing debt is stored with each selected location, however a multiplicity of data groups shown in FIG. 3B, one for each path, can be associated with the selected location.

When the circuits to be synthesized become large, the procedure herein described takes progressively larger amounts of time to execute as the multiplicity of possible paths increases. When the circuit to be synthesized has latches that are activated by clock signals, the analysis can be performed from clock signal driven latch element to clock signal driven latch element and the timing delay between the clock signals can be used in a manner similar to use of the budget timing delay for the latch receiving the delayed signal. Using the technique described above, the timing debt can be determined for each location. The timing debt can then be used as one of the criterion by which the synthesis of the logic circuit is controlled. Timing information with respect to an input signal terminal and output signal terminals can be associated with each port instance. The parameters associated with each port instance in the situation illustrated by FIG. 4 are shown in FIG. 6. As with the multipath method, only one timing debt, the worst possible case, is associated with each port instance. Each possible port instance, therefore, has a reduced number of timing parameters associated therewith as compared with the situation in which the timing delay parameters are associated with a multiplicity of paths intersecting the port instance. In this manner, greatly expanded circuit designs can be analyzed with respect to timing delays.

In the synthesis programs, the ability to manipulate the timing delays of model instances (gates) has been found to become excessively slow when the number of model instances approaches 1000. In order to alleviate this problem, the technique illustrated in FIG. 4 can be used.

It will be clear to those skilled in the art that the present invention can work most advantageously with a synthesis system that permits the following of circuit paths in a forward or reverse direction relative to the signal flow direction and having the capability of storing potentially large data structures in association with appropriate (terminal and component port) locations. Such a synthesis system is described in the applications referred to in the Related Publications section and, in particular, to the application entitled "Procedure and Data Structure for Synthesis and Transformation of Logic Circuit Designs". The existence of a process for following a signal path in the reverse direction permits the calculation of the reverse time delay without a complicated procedure.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A method of incorporating timing information in a circuit synthesis procedure performed by a data processing system having a memory, the procedure using a circuit representation, stored in the memory, which includes a main input terminal, a main output terminal, and a plurality of interconnected circuit locations including a plurality of model instances, having at least one input terminal and at least one output terminal associated therewith, wherein the timing information is stored in the memory and includes, for at least one input terminal and one output terminal of each of the plurality of selected circuit locations of the circuit representation, at least one predetermined model instance delay value representing a timing delay within a model instance of the circuit representation and at least one predetermined media delay value representing a timing delay between terminals of different model instances of the circuit representation, the method comprising the steps, performed by the data processing system, of:

calculating, by the data processing system, for a first one of the terminals of each selected circuit location, a forward timing delay according to each model instance and media delay value located between the first terminal and the main input terminal, wherein the forward timing delay represents a time required for a signal to travel between the main input terminal of the circuit representation and the first terminal;

assigning, by the data processing system, for the main output terminal of the circuit representation, a budget timing delay value representing a maximum acceptable time delay for a signal travelling from the main input terminal to the main output terminal;

calculating, by the data processing system, for the first terminal of each selected circuit location, a derived budget timing delay constant by subtracting each model instance and media delay value between the first terminal and the main output terminal from the budget timing delay value;

calculating, by the data processing system, for the first terminal of each selected circuit location, a timing debt by subtracting the derived budget timing delay constant of the first terminal from the forward timing delay of the first terminal;

determining, by the data processing system, whether the circuit representation should be modified based on a value of at least one of the calculated timing debts; and modifying, by the data processing system, the circuit representation stored in the memory in accordance with the value of at least one of the calculated timing debts when the determining step determines that the circuit representation should be modified.

2. The method of claim 1, wherein the first terminal of at least one of the selected circuit locations has, relative to various points in the circuit representation, a plurality of calculated forward timing delays, a plurality of derived budget timing delay constants, and a plurality of timing debts each calculated by subtracting one of the derived budget timing delay constants of the first terminal from a corresponding one of the forward timing delays of the first terminal, and wherein the method further comprises the step of selecting one of the timing debts of the first terminal as the timing debt to be used in determining whether the circuit representation should be modified.

3. The method of claim 2, wherein a plurality of timing data groups including at least one of said forward timing delays, said derived budget timing delay constants, and said timing debts is associated with at least one selected circuit location of the circuit representation, the method further including the step of associating each of said plurality of timing groups with a circuit location interconnection path of the circuit representation.

4. The method of claim 3, wherein the circuit representation further comprises latch components, each having at least one of the input terminals and at least one of the output terminals.

5. The method of claim 3, wherein each of the plurality of timing data groups associated with each selected circuit location further comprises time delay information for a clocked latch component.

6. The method of claim 2, wherein the circuit representation further comprises latch components each having at least one of the input terminals and at least one of the output terminals and wherein each latch component has a plurality of calculated forward timing delays, the method further comprising the step of selecting the longest forward timing delay for the latch component as the forward timing delay to be used in the calculation of the timing debt for at least one of the terminals of the latch component.

7. The method of claim 1, further comprising the step of replacing at least one selected model instance of the circuit representation stored in the memory with a different model instance in response to the calculation of at least one of the timing debts.

8. The method of claim 1, wherein the interconnected circuit locations can be traversed in any direction.

9. In a data processing system having a memory, a method of designing a circuit to be fabricated, the method comprising the steps, performed by the data processing system, of:

generating, by the data processing system, a circuit representation corresponding to the circuit to be fabricated and storing the circuit representation in the memory, the circuit representation including a plurality of main input terminals, a plurality of main output terminals, a plurality of start references each having at least one point, and a plurality of interconnected model instances each having at least one input terminal and at least one output terminal;

storing, by the data processing system, in the memory of the data processing system, timing information related to the circuit representation, the timing information including, for at least one input terminal and at least one output terminal of each of the plurality of model instances of the circuit representation, at least one predetermined model instance delay value representing a timing delay within the model instance and at least one predetermined media delay value representing a timing delay between terminals of different ones of the model instances of the circuit representation;

calculating, by the data processing system, forward timing delays for a first one of the terminals of each model instance, each of the forward timing delays including the model instance and media delay values located between a respective one of the points in a given one of the start references and the first terminal of the model instance, wherein each forward timing delay represents a time required for a signal to travel between the respective one of the points in the given start reference and the first terminal of the model instance;

assigning, by the data processing system, for each main output terminal of the circuit representation, a budget timing delay value representing a maximum acceptable time delay for a signal travelling from any of the main input terminals to the main output terminal;

calculating, by the data processing system, derived budget timing delay constants for the first terminal of each model instance, each derived budget timing delay constant being calculated by subtracting each model instance and media value between one of the main output terminals and the first terminal of the model instance from the budget timing delay value assigned to the main output terminal;

calculating, by the data processing system, timing debts for the first terminal of each model instance, each timing debt being calculated by subtracting one of the derived budget timing delay constants of the first terminal of the model instance from a corresponding one of the forward timing delays of the first terminal of the model instance;

selecting, by the data processing system, one of the timing debts of the first terminal;

determining, by the data processing system, whether the circuit representation should be modified based on a value of at least the selected timing debt; and modifying, by the data processing system, the circuit representation stored in the memory in accordance with the value of at least the selected timing debt when the determining step determines from the value of at least the selected timing debt that the circuit representation should be modified.

10. The method according to claim 9, wherein one of the points in the given start reference corresponds to one of the main input terminals.

11. The method according to claim 9, wherein at least one of the model instances includes a first clocked latch component activated by a first clock signal and a second clocked latch component activated by a second clock signal.

12. The method according to claim 9, wherein the interconnected model instances can be traversed in any direction.

13. The method according to claim 9, wherein the corresponding forward timing delays and derived budget timing delay constants are arranged in groups such that the forward timing delays and derived budget timing delay constants in each group relate to the same start reference.

14. The method according to claim 9, wherein:
the main output terminals constitute an end reference;
the main input terminals constitute a first one of the start references;
a second one of the start references consists of a group of latches which are clocked by a first clock signal; and a third one of the start references consists of a group of latches which are clocked by a second clock signal.

15. In a data processing system having a memory, a method of designing a circuit to be fabricated, the method comprising the steps, performed by the data processing system, of:

generating, by the data processing system, a circuit representation corresponding to the circuit to be fabricated and storing the circuit representation in the memory, the circuit representation including a main input terminal, a main output terminal, and a plurality of interconnected model instances each having at least one input terminal and at least one output terminal;

storing, by the data processing system, in the memory of the data processing system, timing information related to the circuit representation, the timing information including, for at least one input terminal and at least one output terminal of each of the plurality of model instances of the circuit representation, at least one predetermined model instance delay value representing a timing delay within the model instance and at least one predetermined media delay value representing a timing delay between terminals of different ones of the model instances of the circuit representation;

calculating, by the data processing system, for a first one of the terminals of each model instance, a forward timing delay including each model instance and media delay value located between the first terminal of the model instance and the main input terminal, wherein the forward timing delay represents a time required for a signal to travel between the main input terminal of the circuit representation and the first terminal of the model instance;

assigning, by the data processing system, for the main output terminal of the circuit representation, a budget timing delay value representing a maximum acceptable time delay for a signal travelling from the main input terminal to the main output terminal;

calculating, by the data processing system, for the first terminal of each model instance, a derived budget timing delay constant by subtracting each model instance and media value between the first terminal of the model instance and the main output terminal from the budget timing delay value;

calculating, by the data processing system, for the first terminal of each model instance, a timing debt by subtracting the derived budget timing delay constant of the first terminal of the model instance from the forward timing delay of the first terminal;

determining, by the data processing system, whether the circuit representation should be modified based upon a value of at least one of the calculated timing debts; and modifying, by the data processing system, the circuit representation stored in the memory in accordance with the value of at least one of the calculated timing debts when the determining step determines from the value of at least one of the calculated timing debts that the circuit representation should be modified.

16. The method according to claim 15, wherein the modifying step is performed automatically by the data processing system.

17. The method according to claim 15, further comprising the step of fabricating the circuit represented by the modified circuit representation.

* * * * *